United States Patent
Wei et al.

(10) Patent No.: US 11,399,333 B2
(45) Date of Patent: Jul. 26, 2022

(54) APPARATUS AND METHOD FOR A MOBILE TELECOMMUNICATIONS SYSTEM

(71) Applicant: Sony Corporation, Tokyo (JP)

(72) Inventors: Yuxin Wei, Basingstoke (GB); Brian Alexander Martin, Basingstoke (GB); Vivek Sharma, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/469,654

(22) PCT Filed: Dec. 21, 2017

(86) PCT No.: PCT/EP2017/084279
§ 371 (c)(1),
(2) Date: Jun. 14, 2019

(87) PCT Pub. No.: WO2018/115386
PCT Pub. Date: Jun. 28, 2018

(65) Prior Publication Data
US 2020/0084700 A1    Mar. 12, 2020

(30) Foreign Application Priority Data
Dec. 22, 2016    (EP) .................................. 16206526

(51) Int. Cl.
*H04W 48/10* (2009.01)
*H04W 68/08* (2009.01)
*H04W 92/20* (2009.01)

(52) U.S. Cl.
CPC ........... *H04W 48/10* (2013.01); *H04W 68/08* (2013.01); *H04W 92/20* (2013.01)

(58) Field of Classification Search
CPC ..... H04W 40/28; H04W 48/16; H04W 72/02; H04W 72/0406; H04W 72/0413; H04W 72/048; H04W 72/0486; H04W 88/02; H04W 88/08; H04W 88/16; H04W 24/10; H04W 36/0085; H04W 36/0088;
(Continued)

(56) References Cited

U.S. PATENT DOCUMENTS 7,835,741 B2 *    11/2010    Lee .................... H04W 48/18
                                                              455/435.2
8,392,482 B1 *    3/2013    McAlister ........... G06F 16/1727
                                                              707/899
(Continued)

FOREIGN PATENT DOCUMENTS

CN    101467477 A    6/2009
WO    2018/065527 A1    4/2018

OTHER PUBLICATIONS

International Search Report and Written Opinion dated Feb. 5, 2018 for PCT/EP2017/084279 filed on Dec. 21, 2017, 14 pages.
(Continued)

*Primary Examiner* — Joseph Arevalo
(74) *Attorney, Agent, or Firm* — Xsensus LLP

(57) ABSTRACT

An apparatus comprising circuitry configured to distribute an area-specific system information update.

18 Claims, 9 Drawing Sheets

(58) Field of Classification Search
CPC ..... H04W 36/18; H04W 36/30; H04W 48/12; H04W 68/00; H04W 72/042; H04W 84/12
USPC .... 455/437, 418, 450, 434, 466, 552.1, 408, 455/446, 458, 574, 419, 404.1, 435.2, 455/435.3, 435.1, 456.1, 456.6, 41.1, 410, 455/426.1
See application file for complete search history.

(56) References Cited

U.S. PATENT DOCUMENTS

| | | | |
|---|---|---|---|
| 2003/0070162 A1* | 4/2003 | Oshima | G06F 8/65 717/171 |
| 2007/0259675 A1 | 11/2007 | Worrall | |
| 2008/0177994 A1* | 7/2008 | Mayer | G06F 9/4418 713/2 |
| 2009/0292458 A1* | 11/2009 | Nakamura | G08G 1/096827 701/532 |
| 2010/0272017 A1* | 10/2010 | Terry | H04W 48/12 370/328 |
| 2012/0044870 A1* | 2/2012 | Mochizuki | H04W 72/02 370/328 |
| 2013/0010619 A1* | 1/2013 | Fong | H04W 72/0453 370/252 |
| 2013/0016841 A1* | 1/2013 | Fong | H04W 72/0413 380/287 |
| 2014/0153443 A1* | 6/2014 | Carter | H04L 45/54 370/256 |
| 2016/0192292 A1 | 6/2016 | Höglund | |
| 2016/0234735 A1 | 8/2016 | Kubota et al. | |
| 2017/0006512 A1* | 1/2017 | Hole | H04W 36/0083 |
| 2017/0220253 A1* | 8/2017 | Kohara | G06F 3/061 |
| 2017/0311290 A1* | 10/2017 | Adjakple | H04W 36/00 |
| 2017/0332288 A1* | 11/2017 | Sadek | H04L 5/001 |
| 2018/0092155 A1* | 3/2018 | Hong | H04W 36/32 |
| 2018/0095693 A1* | 4/2018 | Kikkawa | G06F 3/0644 |
| 2018/0098269 A1* | 4/2018 | Pradas | H04W 48/12 |
| 2018/0359201 A1* | 12/2018 | Rangasamy | H04L 43/08 |
| 2019/0132749 A1* | 5/2019 | Wei | H04W 68/02 |
| 2019/0174571 A1* | 6/2019 | Deenoo | H04W 76/11 |
| 2019/0230625 A1* | 7/2019 | Kim | H04W 8/02 |
| 2019/0364408 A1* | 11/2019 | Park | H04L 5/0053 |
| 2019/0364492 A1* | 11/2019 | Azizi | H04W 48/10 |

OTHER PUBLICATIONS

Ericsson, "System Information scheduling problems", 3GPP TSG-RAN Working Group 2 (Radio layer 2 and Radio layer 3), R2-001963, Beijing, PR China, Oct. 9-13, 2000, 25 pages.

ZTE, "System information delivery in NR", 3GPP TSG-RAN WG2, Meeting No. 95, R2-165111, Gothenburg, Sweden, Aug. 22-26, 2016, 6 pages.

Sharp, "Signaling Reduction Method for On-demand SI Delivery and Use Cases", 3GPP TSG RAN WG2 Meeting No. 96, R2-167641, Reno, NV, USA, Nov. 14-18, 2016, pp. 1-4.

Samsung, "Comparison of index based approaches", 3GPP TSG-RAN WG2 Meeting No. 96, R2-168086, Reno, Nevada, Nov. 14-18, 2016, 6 pages.

Catt, "System Information Area", 3GPP TSG RAN WG2 Meeting No. 95, R2-164809, Gothenburg, Sweden, Aug. 22-26, 2016, pp. 1-5.

Huawei et al., "Further Discussions of Minimum SI", 3GPP TSG-RAN2 Meeting No. 95bis, R2-166202, Kaohsiung, Oct. 10-14, 2016, 3 pages.

Samsung, "Contents of Minimum System Information", 3GPP TSG-RAN WG2 Meeting No. 95bis, R2-166493 (Update of R2-165200), Kaohsiung, Taiwan, Oct. 10-14, 2016, 4 pages.

Mediatek Inc., "Stored System Information for OSI", 3GPP TSG-RAN2 Meeting No. 96, R2-168148, Reno, USA, Nov. 14-18, 2016, 4 pages.

\* cited by examiner

```
pagingMessage
  L pagingRecordList
     ├ pagingRecord1
     ├ pagingRecord2
     └ ...
  L AreaSIModification ———— 401
```

```
SystemInformationBlockType1
  ├ PLMN-IdentityList
  ├ TrackingAreaCode
  ├ CellIdentity
  ├ CellBarred
  ├ IntraFreqReselection
  ├ CSG-Indication
  ├ p-Max
  ├ freqBandIndicator
  ├ si-Periodicity
  ├ sib-MappingInfo
  ├ si-WindowLength
  ├ systemInfoValueTag ⸺ 601
  ├ csg-Identity
  └ ims-EmergencySupport
```

Fig. 6

```
pagingMessage
  └ pagingRecordList
      ├ pagingRecord1
      ├ pagingRecord2
      └ ...
    ├ AreaSIModification ⸺ 701
    └ SIUpdateInformation ⸺ 702
```

Fig. 7

```
SystemInformationBlockType1
 ├ ..
 ├ systemInfoValueTag
 └ ...

SystemInformationBlockType19
 ├ ..
 ├ SIUpdateInformation
 └ ...
```

Fig. 8

```
AreaSIModification
 ├ commonSIupdate
 └ cellSIupdate
    ├ cell1SIupdate
    └ cell2SIupdate
```

Fig. 9

APPARATUS AND METHOD FOR A MOBILE TELECOMMUNICATIONS SYSTEM

CROSS-REFERENCE TO RELATED APPLICATIONS

The present application is based on PCT filing PCT/EP2017/084279, filed Dec. 21, 2017 which claims priority to EP 16206526.2, filed Dec. 22, 2016, the entire contents of each are incorporated herein by reference.

TECHNICAL FIELD

The present disclosure generally pertains to entities and user equipment of a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so called Long Term Evolution ("LTE"), which is a wireless communication technology allowing high-speed data communications for mobile phones and data terminals and which is already used for 4G mobile telecommunications systems. Other candidates for meeting the 5G requirements are termed New Radio Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

LTE is standardized under the control of 3GPP ("3rd Generation Partnership Project"). There exists a successor LTE-A (LTE Advanced) allowing higher data rates as the basis LTE which is also standardized under the control of 3GPP.

For the future, 3GPP plans to further develop LTE-A, such that it will be able to fulfill the technical requirements of 5G.

However, although there exist signaling techniques for the 5G technologies, it is generally desirable to improve the signaling.

SUMMARY

According to a first aspect, the disclosure provides an apparatus comprising circuitry configured to distribute an area-specific system information update.

According to a further aspect, the disclosure provides an apparatus that is configured to receive an area-specific system information update.

According to a further aspect, the disclosure provides a method comprising distributing an area-specific system information update.

According to a further aspect, the disclosure provides a method comprising determining if one of the cells in a system information area has changed the system information configurations, and, if the system information configuration has changed, sending a notification to UEs in a paging message, and/or notifying other cells in the system information area to send the notification in their paging messages as well.

According to a further aspect, the disclosure provides a method comprising transmitting a system information change notification and/or a system information update to an anchor cell; sending, by the anchor cell, a paging message with a system information change notification within the system information area that the anchor cell controls; and if the anchor cell cannot cover all the UEs in the area, sending a system information change notification to other cells in the system information area; and sending, by each cell that received the system information change notification, a paging message containing the system information change notification to user equipment controlled by the respective cells.

Further aspects are set forth in the dependent claims, the following description and the drawings.

BRIEF DESCRIPTION OF THE DRAWINGS

Before a detailed description of the embodiments under reference of FIG. 1 is given, some general explanations are made.

FIG. 6 shows an embodiment of a system information change notification that is transmitted on a broadcast channel;

FIG. 7 provides an example of a paging message by which a SI change notification and a SI table update is transmitted;

FIG. 8 provides an example of transmitting SI table update information in broadcast signaling;

FIG. 9 shows an embodiment of an AreaSIModification information element;

DETAILED DESCRIPTION OF EMBODIMENTS

Figure 1:
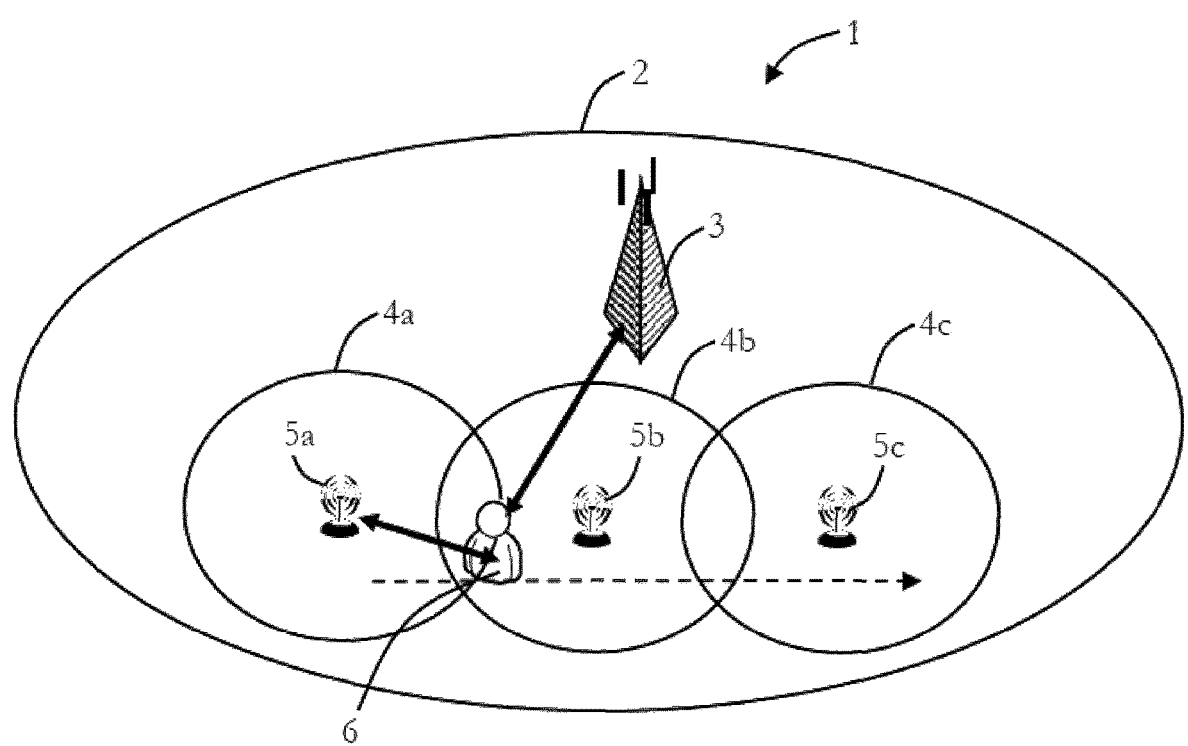
FIG. 1 illustrates a radio access network including an LTE cell and NR cells.

Before a detailed description of the embodiments under reference of FIG. 1 is given, some general explanations are made.

As the 5G system will be based on LTE or LTE-A, respectively, it is assumed that specific requirements of the 5G technologies will, basically, be dealt with by features and methods which are already defined in the LTE and LTE-A standard documentation.

5G technologies will allow a concept of a so called "virtual cell" or "local cell" or the like, which may also be based on New Radio Access Technology Systems (NR). In this concept, a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

A logical separation between control plane and user plane has been achieved in accordance with the introduction of the IP Multimedia System (IMS) for LTE, and a physical separation between control plane and user plane has been proposed as a possible solution for 5G or NR. Since requirements for the control plane should be basically robustness and wide coverage so as to maintain the service continuity, a macro or anchor entity (e.g. base station or Evolved Node B) should provide a link of the control plane. On the other hand, a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE or other NR station in the function as a virtual cell, local cell, micro or pico cell, Transmission/Reception Point (TRP), small cell provided by NR eNodeBs, or the like should be able to take over responsibilities, which are typically handled, for example, in a base station, or eNodeB (Evolved Node B) as it is called in LTE (the eNodeB is the element in the evolved UTRA of LTE, the UTRA being the UMTS Terrestrial Radio Access). Such responsibilities, which are envisaged to be performed in the UE as a virtual cell or the other NR stations or entities mentioned above, are, for example, radio resource management, radio resource control (RRC), connection control, etc.

The embodiments described below in more detail provide an apparatus comprising circuitry configured to distribute an area-specific system information update.

The apparatus may for example be a virtual cell, a local cell, a micro or pico cell, a Transmission/Reception Point (TRP), a small cell provided by NR eNodeBs, a base station, or an eNodeB.

An apparatus as described above may for example be a mobile telecommunications system entity, in particular an anchor entity, for a mobile telecommunications system including at least one entity serving at least one user equipment, wherein the at least one entity and the at least one user equipment are located in a common system information area, as discussed above.

An apparatus as described here (e.g. an (anchor) entity of a NR) may comprise circuitry configured to transmit minimum system information to at least one user equipment.

The circuitry may include at least one of: processor, microprocessor, dedicated circuit, memory, storage, radio interface, wireless interface, network interface, or the like, e.g. typical electronic components which are included in a base station, such as an eNodeB.

The minimum system information may also include cell access information, cell select information, information for acquiring other SI (everything not in minimum SI) and the like. The apparatus may provide a respective (anchor) cell, as it is generally known.

The mobile telecommunications system may be LTE based and/or NR based. In particular, it may be a mixture of LTE and NR, and may fall under at least one of the four cases as discussed in R2-164809 mentioned above. The minimum system information may further include information about entities within the system information area. This information can be provided, for example, by a list including identification numbers or the like of entities within the same system information area. The transmitting, as used herein, may also include broadcasting and unicasting.

The circuitry may be further configured to transmit information about entities within the system information area on demand to the at least one user equipment. The user equipment may transmit a request to the entity (or another entity which forwards the request to the entity) and the entity may transmit in response to this request the information about entities based on the request. In another embodiment, the circuitry may be further configured to transmit information about entities within the system information area to the at least one user equipment without any explicit request from user equipment, for example, in the case that the related system information has been changed.

The system information update may comprise common system information and/or cell specific system information.

The circuitry may be configured to update system information for index based system information.

The circuitry may be configured to transmit a system information change notification via area based paging.

The circuitry may be configured to transmit a system information change notification to another cell via Xn-interface.

The circuitry may be configured to determine if one of the cells in a system information area has changed the system information configurations, and, if the system information configuration has changed, send a notification to UEs in a paging message, and/or notify other cells in the system information area to send the notification in their paging messages as well.

The circuitry may be configured to transmit a system information change notification and/or a system information update to an anchor cell.

The circuitry may be configured to transmit a system information change notification via a broadcast channel.

The circuitry may be configured to transmit a system information change notification via a broadcast channel, e.g. included in the minimum system information of an anchor cell or of each cell of a system information area.

The circuitry may be configured to transmit scheduling info that relates to a system information update by broadcast signaling.

The circuitry may be configured to transmit a system information change notification with an area specific RNTI in a dedicated channel.

The circuitry may be configured to transmit a system information update of an area-specific system information table in a paging message.

The circuitry may be configured to transmit a system information update of an area-specific system information table in broadcast signaling.

The circuitry may be configured to transmit a system information update of an area-specific system information table in dedicated signaling on demand.

The circuitry may be configured to transmit a system information update of an area-specific system information by transmitting only the system information that has actually changed (e.g. "delta signaling").

The apparatus may for example be a virtual cell, a local cell, a micro or pico cell, a Transmission/Reception Point (TRP), a small cell provided by NR eNodeBs, a base station, or an eNodeB.

The embodiments described below in more detail also provide an apparatus that is configured to receive an area-specific system information update.

The apparatus may for example be a User Equipment.

The embodiments described below in more detail also provide a method comprising distributing an area-specific system information update.

The method may comprise transmitting a system information change notification via area based paging, via Xn communication, via a broadcast channel, or with an area specific RNTI in a dedicated channel.

The method may comprise transmitting a system information update of an area-specific system information table in a paging message, in broadcast signaling, or in dedicated signaling on demand.

The embodiments described below in more detail also provide a method comprising determining if one of the cells in an system information area has changed the system information configurations, and, if the system information configuration has changed, sending a notification to UEs in a paging message, and/or notifying other cells in the system information area to send the notification in their paging messages as well.

The embodiments described below in more detail also provide a method comprising transmitting a system information change notification and/or a system information update to an anchor cell; sending, by the anchor cell, a paging message with a system information change notification within the system information area that the anchor cell controls; and, if the anchor cell cannot cover all the UEs in the area, sending a system information change notification to other cells in the system information area; and sending, by each cell that received the system information change notification, a paging message containing the system information change notification to user equipment controlled by the respective cells.

The method may further comprise checking, by the anchor cell, a system information update to determine with which cells the system information update is related.

The method may further comprise sending, by the anchor cell, a system information change notification and/or the system information update to cells that are related with the system information update.

Management and Distribution of System Information (SI)

The management and distribution of system information (SI) is one example of radio resource management. For example, as initial procedure for an NR UE to access the NR, system information (SI) is broadcast and acquisition helps the UE to operate properly within the NR system.

3GPP document R2-166202 and R2-166493 describe Minimum SI that may include information needed in cell selection, acquiring other SI (everything not broadcasted in minimum SI), and initial access to the cell. Minimum SI may aim at supporting the basic network function and consists of information that UE acquires at the very beginning of network access, without any other information of the system. Minimum SI may be broadcasted periodically, whereas other SI may be acquired on demand. The structure of minimum SI may follow LTE kind of approach: MIB kind of information, which contains very limited but fundamental information, is broadcasted quite frequently (the detailed periodicity and contents could be determined by RAN1). In addition, SIB1 kind of information may indicate the scheduling of the rest of broadcasted SIs and could be broadcasted with relatively longer periodicity. The contents of the minimum SI can be cell-specific depending on the capability of a cell.

System Information Area (SIA)

In 3GPP document R2-164809, "System Information Area", 3GPP TSG RAN WG" Meeting #95, Gothenburg, Sweden, 22-26 Aug. 2016, four scenarios are listed for an NR system information enhancement study and, moreover, a concept of a system information area is introduced.

A system Information Area (SIA) may be an area where all TRP/beams in the SIA are configured with at least some common essential system information (SI) and possibly part of non-essential SI which is broadcasted. In some embodiments, if this includes System Frame Number then all TRPs in the same SIA are synchronized. The broadcast can be handled by each TRP individually (single frequency network (SFN) transmission if synchronized), and/or via overlaid node(s) (e.g. LF macro), and/or a combination of local TRP broadcast and coverage overlaid node(s) e.g. different SI-Y broadcasted locally by each TRP and other common essential SI (SI-X)+non-essential SI which is broadcasted over overlaid node(s) (wherein SI-X is defined in R2-164809 as common part across an area involving potentially multiple TRP/beams that can be acquired early, and SI-Y as TRP/beam-specific part that may be acquired only before performing RACH).

Alternatively or additionally, the SIA may be a set of potentially different essential SIs used by different TRPs in the SIA commonly broadcasted by overlaid node(s) (e.g. LF macros) over the SIA coverage.

A UE may store system information from previously visited cells. For example, with a SIA a UE can get system information from other cells (e.g. via an anchor cell) and as long as the area ID keeps the same, the UE can skip the acquisition of the stored system information. This is beneficial in reducing the signaling overhead when a UE moves across the cells in an SIA. This aspect can also be referred to as "indexed based system information".

The stored system information may include only the common system information among cells (as for example described in 3GPP R2-168148) or include both of the common and the cell specific system information (as for example described in 3GPP R2-168086).

In some embodiments, the system information area concept may be supported in NR system information transmission/reception for an efficient system information distribution. Some embodiments pertain to solutions on how to dynamically configure/re-configure system information area including system information area identifier as well as anchor cell/cells in one system information area. Furthermore, some embodiments pertain to the solution how to transmit on-demand system information within the same or across different system information areas.

In some embodiments, a system information area is composed of one or more entities (e.g. LTE and/or NR eNodeB, LTE/NR central units (CU), LTE/NR distributed units (DU), LTE/NR Transmit and Receive Point (TRP), or the like). As discussed above, within this system information area, the system information (or minimum system information) would be the same or different among different entities. In some embodiments, each system information area will have a unique identifier and this identifier will be used by the UE to judge whether it moves to a new system information area or not.

In some embodiments, as mentioned, the system information area is introduced when an anchor entity or an anchor cell (or two or more anchor entities/cells) is provided.

As mentioned, in some embodiments, a system information area may be an aggregation of one or more entities, wherein among these entities one or more anchor cells (anchor entities) are provided which collect system information and/or scheduling information of other entities and send the collected system and/or scheduling information to the UEs on behalf of these other entities, as will also be discussed further below.

In some embodiments, as mentioned, the system information area is introduced based on the area where a specific service is provided. For example, MBMS service is on the air in the specific region, common system information for a specific service is defined and broadcasted in the system information area.

In some embodiments, the system information area configuration can be changed dynamically. The dynamic change of the system information area configuration may include at least one of: splitting the system information area, merging system information areas, changing an anchor entity in the system information area, add a cell to the system information area, remove a cell from the system information area.

FIG. 1 illustrates a RAN 1 which has a macro cell 2, which is established by a LTE eNodeB 3, which may also be exemplary an anchor entity. Moreover, three pico cells 4a, 4b and 4c are provided, which are each established by a respective NR eNodeB 5a, 5b and 5c, respectively. The NR cells 4a-c may also include more than one TRP/DU (transmission reception point/distributed unit) connected to a single CU (central unit). A UE 6 can communicate with the LTE eNodeB 3 and, as long it is within one of the pico cells 4a, 4b and 4c, respectively, it can also communicate with the associated NR eNodeB 5a, 5b and 5c, respectively. In this embodiment, the LTE eNodeB 3 and the NR eNodeBs 5a, 5b and 5c form a system information area, as also discussed above. The system information area has a specific identifier, on the basis of which the system information area can be identified. The UE 6 may travel around (see dashed arrow), and in this simple mobility scenario, the UE 6 remains under the coverage of the same LTE cell 2, while passing through the coverage of multiple NR small cells, such as the three NR cells 4a-c.

Figure 2:
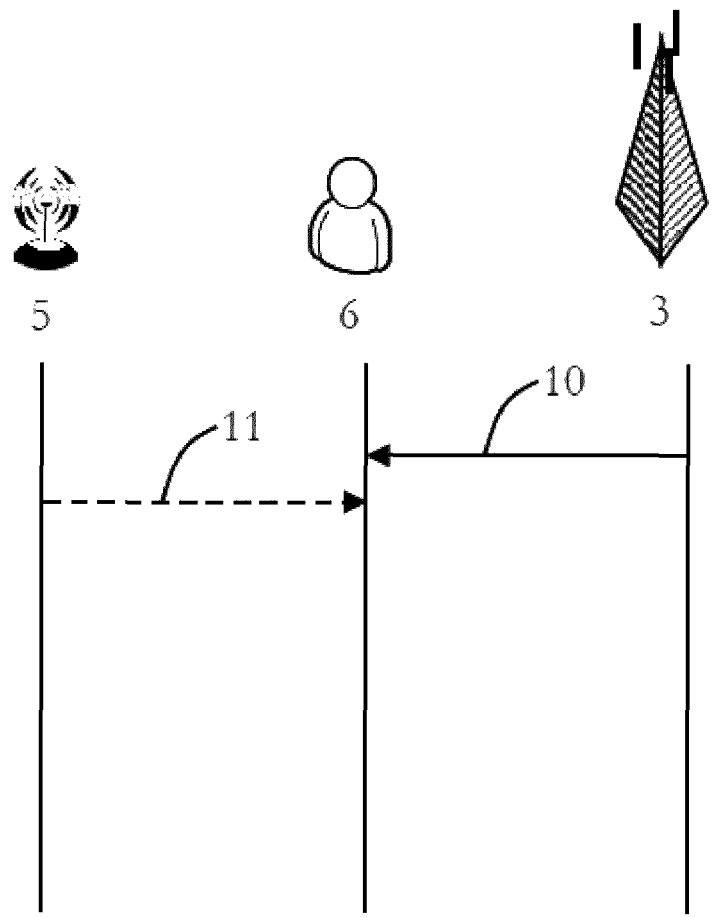
FIG. 2 illustrates a transmission scheme for system information pertaining to system information distribution.

As illustrated in FIG. 2, showing message transmission for a LTE eNodeB 3, a UE 6 and an NR eNodeB 5, at 10, the system information area identifier and a list of entities (e.g. entity ID) included in this system information area are broadcasted e.g. in the minimum system information by one or two entities e.g. a CU or anchor entity, which is in the present example the LTE eNodeB 3 (alternatively or in addition to, the eNodeB 5 may also transmit the minimum system information as indicated at 11 with the dashed arrow). The UE 6 receives the minimum system information including the list of entities.

With this list, the UE 6 can determine whether it moves to a new area from e.g. synchronization signal which contains the identifier of that entity even before it accesses the system information of that entity.

SIA Specific SI Table

According to the embodiments described below, a SI table which includes different and/or same system information configurations is maintained. For example, for an index based system information distribution, there may be a specific SI table which is applicable within a specific SIA.

UEs moving across the cells in the area may not need to re-acquire the stored system information in the SI table. The SI table may need to be updated if any of the system information of the cell in the SIA has been changed.

The SI table may comprise common system information, that is e.g. applicable to all cells or certain cells in an SIA, and/or cell specific system information, e.g. applicable to only one (or more) specific cell(s). Still further, a SI table may comprise any system information such as minimum SI, other SI.

Figure 3A:
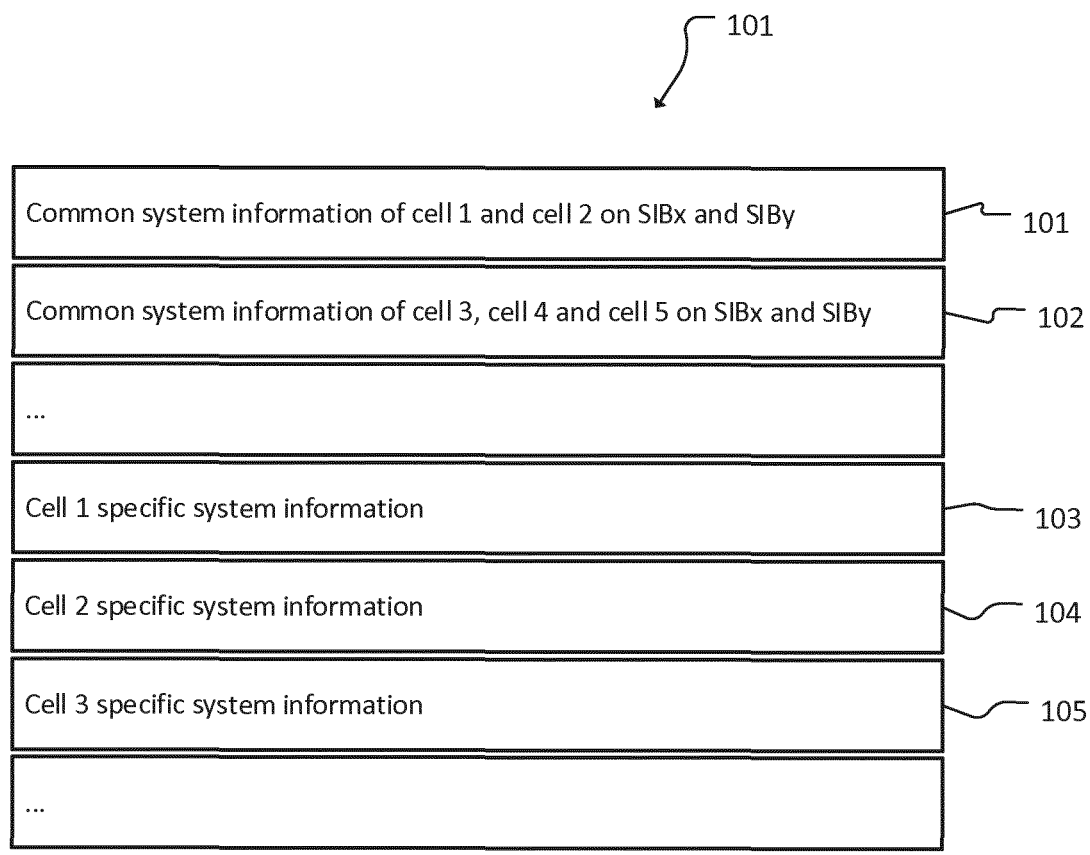
FIG. 3a provides an example of a system information (SI) configuration table.

Examples of a SI configuration table are given in FIGS. 3a, b and c, which include both of the common system information and the cell specific system information among the cells in the same SIA, or with all the possible configurations of cell system information in the SIA.

FIG. 3a provides an example of a SI configuration table 100 which comprises common system information 101 of cell 1 and cell 2 on SIBx and SIBy, and common system information 102 of cell 3, cell 4 and cell 5 on SIBx and SIBy. The SI configuration table 101 further comprises cell specific system information 103 for cell 1, cell specific system information 104 for cell 2, and cell specific system information 105 for cell 3.

Figure 3B:
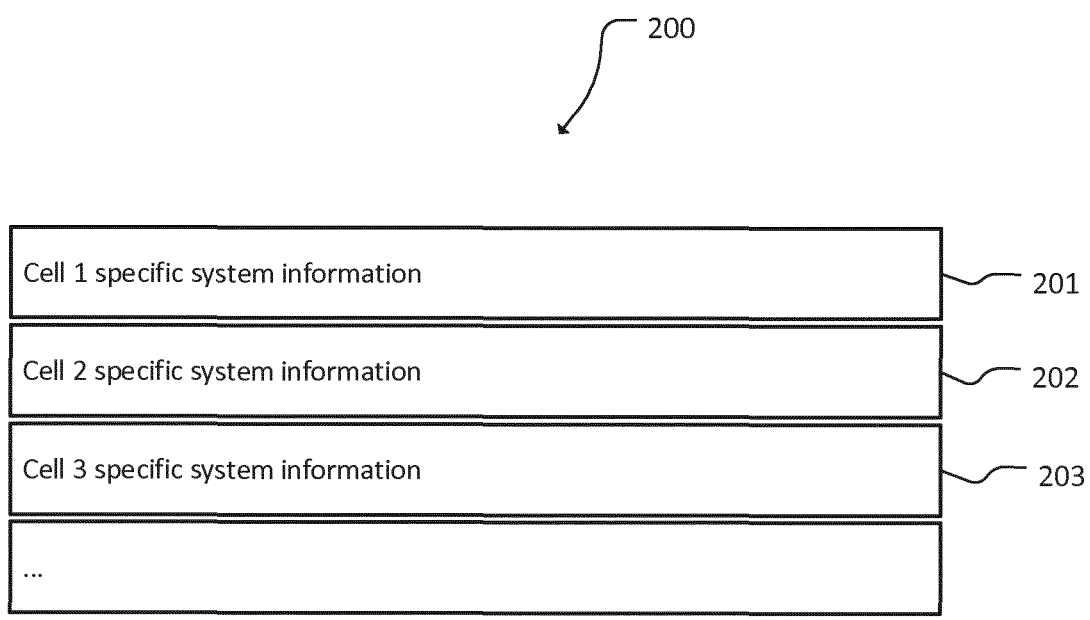
FIG. 3b provides a further example of a system information (SI) configuration table.

FIG. 3b provides an example of a SI configuration table 200 which comprises cell specific system information 201 for cell 1, cell specific system information 202 for cell 2, and cell specific system information 203 for cell 3.

Figure 3C:
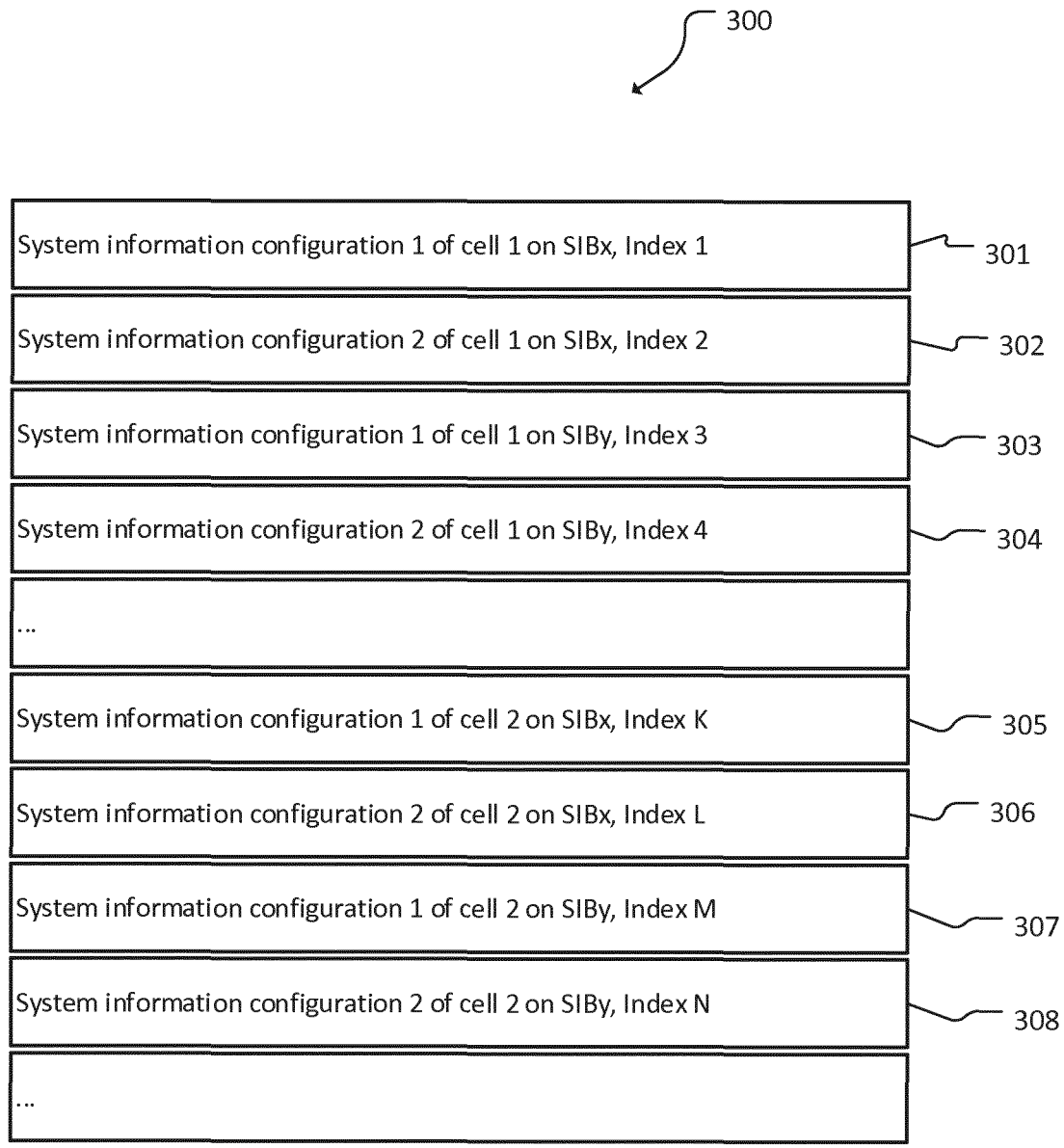
FIG. 3c provides a further example of a system information (SI) configuration table.

FIG. 3c provides an example of a SI configuration table 300 which comprises system information configuration 1, 301, of cell 1 on SIBx, Index 1, system information configuration 2, 302, of cell 1 on SIBx, Index 2, system information configuration 1, 303, of cell 1 on SIBy, Index 3, and system information configuration 2, 304, of cell 1 on SIBy, Index 4. Still further the SI configuration table 300 comprises system information configuration 1, 305, of cell 2 on SIBx, Index K, system information configuration 1, 306, of cell 2 on SIBx, Index L, system information configuration 1, 307, of cell 2 on SIBy, Index M, and system information configuration 1, 308, of cell 2 on SIBy, Index N.

According to other alternatives e.g. only the common system information or all the cell system information will be included. Also an optimization of the table is possible.

SI Table Update

A SI table may be updated if the system information of one of the cells in an SIA is updated. An update of the table may impact all the UEs in the SIA.

The embodiments described below in more detail address the issue on how to update an area-specific SI table. Embodiments on distributing a SI change notification and table updates are described.

The proposed solutions of SI table update for index based system information address the SI update with higher efficiency and less signalling overhead on the update procedure of the SI table.

Transmit SI Change Notification Via Area Based Paging

A SI change notification may relate to a SI table that defines an area specific SI configuration.

According to an embodiment, a SI change notification is transmitted via area based paging.

Assuming that the area is already well defined, the area based paging can be adopted to transmit a SI table update notification.

For example, if one of the cells in the area has changed the configurations in the table, it may send the notification to UEs in its paging message and notify other cells to send the notification in their paging messages as well.

Figures 4, 5:
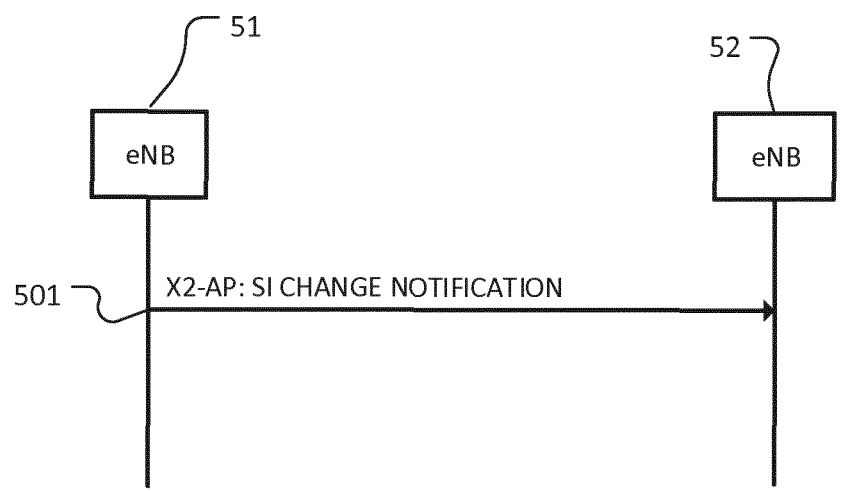
FIG. 4 provides an example of a paging message by which a SI change notification is transmitted.
FIG. 5 provides an example of a cell notifying other cells to send the notification in their paging messages as well.

FIG. 4 provides an example of a paging message by which a SI change notification is transmitted.

The pagingMessage is transmitted on an NR paging channel (NR-PCH) and it comprises a container element pagingRecordList which comprises several paging records, here pagingRecord1, pagingRecord2, etc, that are foreseen to page multiple UEs. In addition, the pagingMessage comprises an information element AreaSIModification 401 that, if present, indicates an area specific SI change. If a UE receives a paging message including such an AreaSIModification IE 401, it may know that the area specific system information has changed (or will change at the next modification period boundary).

FIG. 5 provides an example of a cell notifying other cells to send the notification in their paging messages as well. A source cell, represented by eNB 51, has determined that area-specific system information has changed. The source cell transmits a SI change notification 501 via the Xn-AP interface to a destination cell, represented by eNB 52. Thereby, the source cell 51 notifies the destination cell 52 to send the notification in their paging messages as well. This SI change notification message 501 may include the following information: SIA ID, source cell ID, updated index (if any, to indicate which index in the table has been changed), updated SIB types, updated SI etc.

Alternatively, if one of the cells in the area has changed the configurations in the table, it may send the notification and potentially the updates on the table to an anchor cell (assuming such anchor cell is defined), and the anchor cell may then send a paging message with the SI change notification within the area that the anchor cell controls.

If the anchor cell cannot cover all the UEs in the area, the anchor cell may send a paging message with the SI change notification to all the other cells in the area and each cell may then send this paging message itself.

Still further, the anchor cell may check the SI updates (especially on-demand system information) to learn with which cells the SI updates are related, e.g. if a SI update relates to common system information or a cell specific system information. Accordingly, the anchor cell may then send the paging messages to the related cells, e.g. all cells in the case of common system information updates and only specific cells if an update concerns cell specific system information.

Transmit SI Change Notification Via a Broadcast Channel

According to an alternative embodiment, a system information change notification is transmitted on a broadcast channel. For example, the notification may be included in the minimum SI of an anchor cell or of each cell in the area.

FIG. 6 shows an embodiment of a system information change notification that is transmitted on a broadcast channel. According to this embodiment, the system information change notification is transmitted via a SystemInformationBlockType1 (SIB1) transmission with a "systemInfoValueTag" 601 on an NR Physical Downlink Shared Channel (NR-PDSCH).

The SystemInformationBlockType1 (SIB1) message comprises as information elements: a PLMN-IdentityList which is a list of PLMN identities, a TrackingAreaCode IE that is common for all the PLMNs listed, a CellIdentity that defines the Identity of the cell, a CellBarred IE that defines if a cell is barred, an IntraFreqReselection IE that is used to control cell reselection to intra-frequency cells when the highest ranked cell is barred, or treated as barred by the UE, a CSG-Indication IE which, if set to TRUE, indicates that the UE is only allowed to access the cell if the CSG identity matches an entry in the CSG whitelist that the UE has stored, a p-Max IE that describes the maximum power value applicable for the cell, a freqBandIndicator, a si-Periodicity that indicates the periodicity of the SI-message in radio frames, an sib-MappingInfo that provides a list of the SIBs mapped to this SystemInformation message, a si-WindowLength that defines a Common SI scheduling window for all SIs, a systemInfoValueTag 601 that is used to verify if the system information stored in a UE is valid or not after a modification period boundary, a csg-Identity that provides the identity of the Closed Subscriber Group within the primary PLMN the cell belongs to, and an ims-EmergencySupport IE that indicates whether the cell supports IMS emergency bearer services for UEs in limited service mode.

The systemInfoValueTag 601 according to this embodiment may be an integer number between 0 and 31. If the value of this tag has changed since the UE last read it, then there has been a change in the contents of the system information table. A UE may read this systemInfoValueTag 601 periodically or if it has been out of coverage.

In the case that the table update is also transmitted by broadcast signaling, the corresponding scheduling info can be included as well (e.g. in SIB1 or any other system information block).

According to the changed information in the table, the scheduling of the table can be adjusted, e.g. if the changes in the minimum SI, the corresponding scheduling priority would be higher and/or the periodicity would be shorter.

According to other embodiments the system information change notification is transmitted e.g. in the NR MIB (Master information block). In this example, at least the SIA ID and a corresponding valueTag can be included in addition to other contents in MIB. The valuetag may indicate the change in the area based SI. The MIB may be broadcasted over a NR-BCH by an eNB (or gNB).

The MIB typically includes a limited number of essential and frequently transmitted parameters that are needed to acquire other information from the cell be the first among the other system information blocks or SIB, which are also broadcasted by the eNB.

Transmit SI change notification with an area specific RNTI in a dedicated channel According to yet an alternative embodiment, a system information change notification is transmitted with an area specific RNTI in a dedicated channel. RNTIs (RNTI=Radio Network Temporary Identifier) are used to identify information dedicated to a particular UE or group of UEs on the radio interface, especially if common or shared channels are used for data transmission.

In order to allow transmission of a SI change notification, a pre-define area specific RNTI, e.g. SIA-RNTI is defined. All the UEs will decode the information scrambled with this SIA-RNTI and receive the corresponding notification in the dedicated channel e.g. NR-PDSCH. The SIA-RNTI may for example be an identifier, e.g. 16 bits (example: number FFF1) which are pre-defined when the area is defined. The real message e.g. notification and updated SI is carried in the channel e.g. NR-PDSCH.

Update of an Area-Specific System Information Table

In the following, different embodiments are disclosed on how to update an area-specific system information table.

Transmit SI Table Update in a Paging Message

According to an embodiment, a SI table update (SI update information) is transmitted in a paging message.

FIG. 7 provides an example of a paging message by which a SI change notification and a SI table update is transmitted. The pagingMessage is transmitted on an NR paging channel (NR-PCH) and it comprises a container element pagingRecordList which comprises several paging records, here pagingRecord1, pagingRecord2, etc, that are foreseen to page multiple UEs. In addition, the pagingMessage comprises an information element AreaSIModification 701 that, if present, indicates an area specific SI change. Still further, the pagingMessage comprises an SIUpdateInformation information element 702 which contains information related to a SI table update.

With this alternative, both the notification and the updated table are carried in the paging message.

In order to reduce the paging message size, the delta signaling which only includes the changes can be considered. For the delta signaling, only the updated information will be included. For example, if one wants to add a new resource pool for D2D discovery in SIB19, then only the new resource pool configuration will be included in the update message.

Transmit SI update information in broadcast signaling According to an alternative embodiment, SI table update information is transmitted in broadcast signaling.

For example, the updated table (or update information) may be carried in broadcast signaling e.g. for minimum SI configuration updates and on-demand SI configuration updates in the table. With the notification, the UEs will get the updated table in the broadcast channel of e.g. anchor cell(s) or its serving cell or with the SFN.

FIG. 8 provides an example of transmitting SI table update information in broadcast signaling. A broadcast signaling comprises a SystemInformationBlockType1 (SIB1) which comprises a systemInfoValueTag which indicates that system information has changes. With the notification, the UEs get the updated table SIUpdateInformation in SystemInformationBlockType19 (SIB19) transmitted on the broadcast channel.

In the example of FIG. 8, a SI table is distributed in each related SIB, e.g. if the SI table contains the area based D2D discovery SI. In this example, SIB 19 may be attributed to a single cell.

In another embodiment, the SI update is distinguished from the SIB19 of the own cell. That is, in this case a SIB is area specific. For example, in an area that comprises three cells, the SI table may include SIB19 of cell 1 and cell 2 (common system information).

It should be noted that the SI table must not necessarily include all the cell specific SI within the SIA area. This may depend on the implementation.

For example, SIB19 that is transmitted by cell 3 may include SIB19 information of cell 3 (cell specific system information), as well as SIB19 information of cell 1 and cell 2 (common system information) in the SI table.

According to another example, the SI table is contained in a new defined SIB, e.g. a new SIBx includes all the contents of the SI table.

In order to reduce the broadcast signaling, delta signaling could be adopted.

Transmit SI update information in dedicated signaling on demand According to yet an alternative embodiment, an NR entity might transmit (or a UE can get) SI update information in dedicated signaling on demand, e.g. for on-demand SI configurations update in the table.

If, for example, the UE receives an AreaSIModification notification via paging, it may re-acquire the required system information using a system information acquisition procedure.

In the notification, it could include additional information of which type of SI is updated, e.g. is it common SI or cell specific SI, the SIB types or the cell IDs. With this information, the UE can decide whether to send an SI request for this updated table to e.g. an anchor cell or its serving cell, e.g. according to its serving cell ID and/or interested application type and/or mobility type etc.

FIG. 9 shows a respective embodiment of an AreaSIModification information element. The AreaSIModification information element is a container element that comprises a commonSIupdate IE, and a cellSIupdate IE. The commonSIupdate IE, if included, indicates that common SI has changed. The cellSIupdate, if included, indicates that cell specific SI has changed. In the example of FIG. 9, the cellSIupdate IE comprises a cell1SIupdate IE and a cell2SIupdate IE. The cell1SIupdate IE identifies a specific first cell of which cell specific SI has changed and the cell2SIupdate IE identifies a specific second cell of which cell specific SI has changed.

Mobile Telecommunications System Entity

In the following, an embodiment of a general purpose computer 130 is described under reference of FIG. 10. The computer 130 can be implemented such that it can basically function as any type of entity, base station or new radio base station, transmission and reception point, or user equipment as described herein. The computer has components 131 to 140, which can form a circuitry, such as any one of the circuitries of the entities, base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station, and user equipment.

At the input/output interface 134 several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS and LTE.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding.

Figure 10:
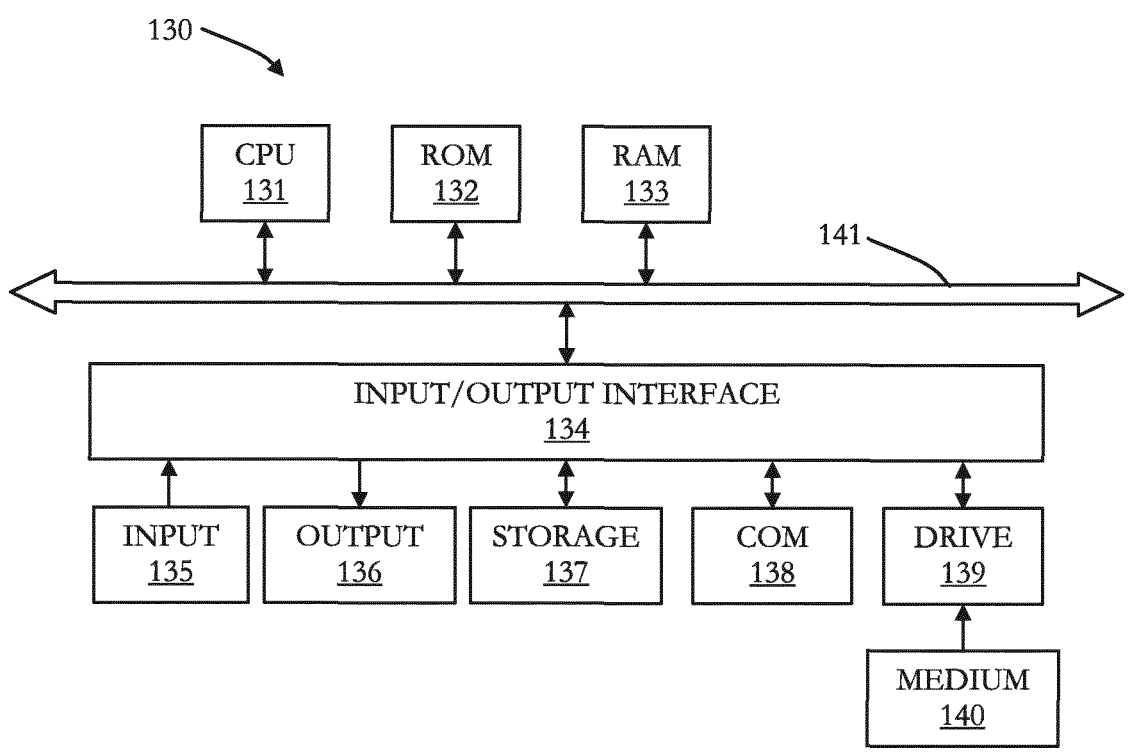
FIG. 10 describes an embodiment of a general purpose computer that may function as any type of apparatus or entity, base station or new radio base station, transmission and reception point, or user equipment.

It should be noted that the division of the control or circuitry of FIG. 10 into units 131 to 140 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An apparatus comprising circuitry configured to distribute an area-specific system information update.

(2) The apparatus of (1) wherein the system information update comprises common system information and/or cell specific system information.

(3) The apparatus of (1) or (2), wherein the circuitry is configured to update system information for index based system information.

(4) The apparatus of anyone of (1) to (3), wherein the circuitry is configured to transmit a system information change notification via area based paging.

(5) The apparatus of anyone of (1) to (3), wherein the circuitry is configured to transmit a system information change notification to another cell via Xn interface.

(6) The apparatus of anyone of (1) to (3), wherein the circuitry is configured to determine if one of the cells in an system information area has changed the system information configurations, and, if the system information configuration has changed, send a notification to UEs in a paging message, and/or notify other cells in the system information area to send the notification in their paging messages as well.

(7) The apparatus of anyone of (1) to (3), wherein the circuitry is configured to transmit a system information change notification and/or a system information update to an anchor cell.

(8) The apparatus of anyone of (1) to (3), wherein the circuitry is configured to transmit a system information change notification via a broadcast channel.

(9) The apparatus of anyone of (1) to (3) or (8), wherein the circuitry is configured to transmit a system information change notification via a broadcast channel, included in the minimum system information of an anchor cell or of each cell of a system information area.

(10) The apparatus of anyone of (1) to (3) or (8) to (9), wherein the circuitry is configured to transmit scheduling info that relates to a system information update by broadcast signaling.

(11) The apparatus of anyone of (1) to (3), wherein the circuitry is configured to transmit a system information change notification with an area specific RNTI in a dedicated channel.

(12) The apparatus of anyone of (1) to (11), wherein the circuitry is configured to transmit a system information update of an area-specific system information table in a paging message.

(13) The apparatus of anyone of (1) to (11), wherein the circuitry is configured to transmit a system information update of an area-specific system information table in broadcast signaling.

(14) The apparatus of anyone of (1) to (11), wherein the circuitry is configured to transmit a system information update of an area-specific system information table in dedicated signaling on demand.

(15) The apparatus of anyone of (1) to (14), wherein the circuitry is configured to transmit a system information update of an area-specific system information by transmitting only the system information that has actually changed.

(16) The apparatus of anyone of (1) to (15), wherein the apparatus is a virtual cell, a local cell, a micro or pico cell, a Transmission/Reception Point (TRP), a small cell provided by NR eNodeBs, a base station, or an eNodeB.

(17) An apparatus that is configured to receive an area-specific system information update.

(18) The apparatus of (17), wherein the apparatus is a User Equipment.

(19) A method comprising distributing an area-specific system information update.

(20) The method of (19), comprising transmitting a system information change notification via area based paging, via X2 communication, via a broadcast channel, or with an area specific RNTI in a dedicated channel.

(21) The method of (19) or (20), comprising transmitting a system information update of an area-specific system information table in a paging message, in broadcast signaling, or in dedicated signaling on demand.

(22) A method comprising determining if one of the cells in an system information area has changed the system information configurations, if the system information configuration has changed, sending a notification to UEs in a paging message, and/or notifying other cells in the system information area to send the notification in their paging messages as well.

(23) A method comprising transmitting a system information change notification and/or a system information update to an anchor cell;

sending, by the anchor cell, a paging message with a system information change notification within the system information area that the anchor cell controls; and if the anchor cell cannot cover all the UEs in the area, sending a system information change notification to other cells in the system information area; and sending, by each cell that received the system information change notification, a paging message containing the system information change notification to user equipment controlled by the respective cells.

(24) The method of (22), further comprising checking, by the anchor cell, a system information update to determine with which cells the system information update is related.

(25) The method of (23), further comprising sending, by the anchor cell, a system information change notification and/or the system information update to cells that are related with the system information update.

The invention claimed is:

1. An apparatus, comprising:
  circuitry, wherein the circuitry is configured to
    distribute an area-specific system information update, wherein the area-specific system information update includes a system information table configured to be associated with the area-specific system,
    wherein the circuitry for distributing the area-specific system information update is further configured to
      transmit a system information change notification and a system information table update corresponding to delta signaling, wherein both the system information change notification and the updated table are carried in a paging message, wherein delta signaling is only system information that has actually changed being included in the system information change notification and only an updated portion of the system information table being included in the system information table update,
      determine if one of the cells in a system information area has changed the system information configurations, and
      in response to the system information configuration being changed, perform one or more of sending a notification to UEs in a paging message and notifying other cells in the system information area to send the notification in their paging messages as well.

2. The apparatus of claim 1, wherein the area-specific system information update comprises common system information and/or cell specific system information.

3. The apparatus of claim 1, wherein the circuitry is configured to update system information which is applicable with an area.

4. The apparatus of claim 1, wherein the circuitry is configured to transmit a system information change notification via area based paging.

5. The apparatus of claim 1, wherein the circuitry is configured to transmit a system information change notification to another cell via Xn interface.

6. The apparatus of claim 1, wherein the circuitry is configured to transmit one or more of a system information change notification and a system information update to an anchor cell.

7. The apparatus of claim 1, wherein the circuitry is configured to transmit a system information change notification via a broadcast channel.

8. The apparatus of claim 1, wherein the circuitry is configured to transmit a system information change notification via a broadcast channel, included in the minimum system information of an anchor cell or of each cell of a system information area.

9. The apparatus of claim 1, wherein the circuitry is configured to transmit scheduling info that relates to a system information update by broadcast signaling.

10. The apparatus of claim 1, wherein the circuitry is configured to transmit a system information change notification with an area specific RNTI in a dedicated channel.

11. The apparatus of claim 1, wherein the circuitry is configured to transmit a system information update of an area-specific system information in a paging message.

12. The apparatus of claim 1, wherein the circuitry is configured to transmit a system information update of an area-specific system information in broadcast signaling.

13. The apparatus of claim 1, wherein the circuitry is configured to transmit a system information update of an area-specific system information in dedicated signaling on demand.

14. The apparatus of claim 1, wherein the apparatus is a virtual cell, a local cell, a micro or pico cell, a Transmission/Reception Point (TRP), a small cell provided by NR eNodeBs, a base station, or an eNodeB.

15. A method, comprising:
  determining if one of the cells in a system information area has changed the system information configurations;
  in response to the system information configuration being changed, sending a notification to UEs in a paging message, wherein the notification is associated with an area-specific system information update comprising a system information table configured to be associated with the area-specific system; and
  notifying other cells in the system information area to send the notification in their paging messages as well,
  wherein sending the notification associated with the area-specific system information update includes
    transmitting a system information change notification and a system information table update corresponding to delta signaling, wherein both the system information change notification and the updated table are carried in a paging message, wherein delta signaling is only system information that has actually changed being included in the system information change notification and only an updated portion of the system information table being included in the system information table update.

16. A method, comprising:
  transmitting one or more of a system information change notification and a system information update to an anchor cell;
  sending, by the anchor cell, a paging message corresponding to delta signaling, wherein the paging message includes both the system information change notification and the system information table update, signaling, within the system information area that the anchor cell controls, wherein delta signaling is only system information that has actually changed being including in the system information change notification and only an updated portion of the system information table being included in the system information table update; and in response to the anchor cell not being able to cover all the UEs in the area, sending the system information change notification and the system information table update to other cells in the system information area;

sending, by each cell that received the system information change notification, a paging message containing the system information change notification and the system information table update to user equipment controlled by the respective cells;

determining if one of the cells in a system information area has changed the system information configurations; and in response to the system information configuration being changed, perform one or more of sending a notification to UEs in a paging message and notifying other cells in the system information area to send the notification in their paging messages as well.

17. The method of claim 15, further comprising checking, by the anchor cell, a system information update to determine with which cells the system information update is related.

18. The method of claim 16, further comprising sending, by the anchor cell, one or more of a system information change notification and the system information update to cells that are related with the system information update.

* * * * *